US012496590B2

(12) United States Patent
Hinterdorfer et al.

(10) Patent No.: US 12,496,590 B2
(45) Date of Patent: Dec. 16, 2025

(54) METHOD FOR CLEANING BLINDING PARTICLES IN CRUSHERS

(71) Applicant: Rubble Master HMH GmbH, Linz (AT)

(72) Inventors: Christian Hinterdorfer, Gutau (AT); Christian Hinterreiter, Obergrünburg (AT)

( * ) Notice: Subject to any disclaimer, the term of this patent is extended or adjusted under 35 U.S.C. 154(b) by 656 days.

(21) Appl. No.: 17/795,514

(22) PCT Filed: Apr. 26, 2021

(86) PCT No.: PCT/AT2021/060140
§ 371 (c)(1),
(2) Date: Jul. 26, 2022

(87) PCT Pub. No.: WO2021/226643
PCT Pub. Date: Nov. 18, 2021

(65) Prior Publication Data

US 2023/0070533 A1 Mar. 9, 2023
US 2025/0222464 A9 Jul. 10, 2025

(30) Foreign Application Priority Data

May 13, 2020 (AT) ............................... A50419/2020

(51) Int. Cl.
*G06N 3/08* (2023.01)
*B02C 23/12* (2006.01)
*B02C 25/00* (2006.01)

(52) U.S. Cl.
CPC .............. *B02C 25/00* (2013.01); *B02C 23/12* (2013.01); *G06N 3/08* (2013.01)

(58) Field of Classification Search
CPC ......... B02C 25/00; B02C 23/12; B02C 13/00; G06N 3/08; B07B 1/50
(Continued)

(56) References Cited

U.S. PATENT DOCUMENTS 4,196,637 A 4/1980 Barrot et al.

FOREIGN PATENT DOCUMENTS

CN 105478220 A * 4/2016 ............ B02C 25/00
CN 210411038 U 4/2020
(Continued)

OTHER PUBLICATIONS

English language abstract for CN210411038U, Apr. 28, 2020.
(Continued)

*Primary Examiner* — Charlotte M Baker
(74) *Attorney, Agent, or Firm* — Tiajoloff & Kelly LLP

(57) ABSTRACT

In a method for cleaning blinding particles in crushers, material to be crushed is fed via a feed stream (1) to a crushing tool, and from there is separated by a screen (7) into a conveyor stream (8) that passes through the screen (7) and a return stream (10) that is held back by the screen (7) and returned to the feed stream (1), thereby forming a conveyance circuit (9). The method makes an efficient, continuous crusher operation possible, wherein idle times for cleaning blinding particles can be avoided. The particle size distribution and/or the material volume are measured at specified intervals in parts of the conveyance circuit (9) and/or conveyor stream (8), and if the particle size distribution and/or material volume deviate above a predefined limit value, the particle size created by the crushing tool is increased for a predefined time period.

13 Claims, 1 Drawing Sheet

(58) Field of Classification Search
USPC .......................................................... 382/156
See application file for complete search history.

(56) References Cited

FOREIGN PATENT DOCUMENTS

| | | | |
|---|---|---|---|
| DE | 1275340 | B | 8/1968 |
| DE | 8106180 | U1 | 7/1981 |
| DE | 20008762 | U1 | 7/2000 |
| DE | 10201100122 | A1 | 9/2012 |
| DE | 102011001218 | A1 | 9/2012 |
| EP | 0426651 | A2 | 5/1991 |
| EP | 0801995 | A1 | 10/1997 |
| WO | 2020/049517 | | 3/2020 |

OTHER PUBLICATIONS

English language abstract for DE102011001221A1, Sep. 13, 2012.
English language abstract for DE102011001218A, Sep. 13, 2012.
English language abstract for EP0426651A2, May 8, 1991.
English language abstract for EP0801995A1, Oct. 22, 1997.

* cited by examiner

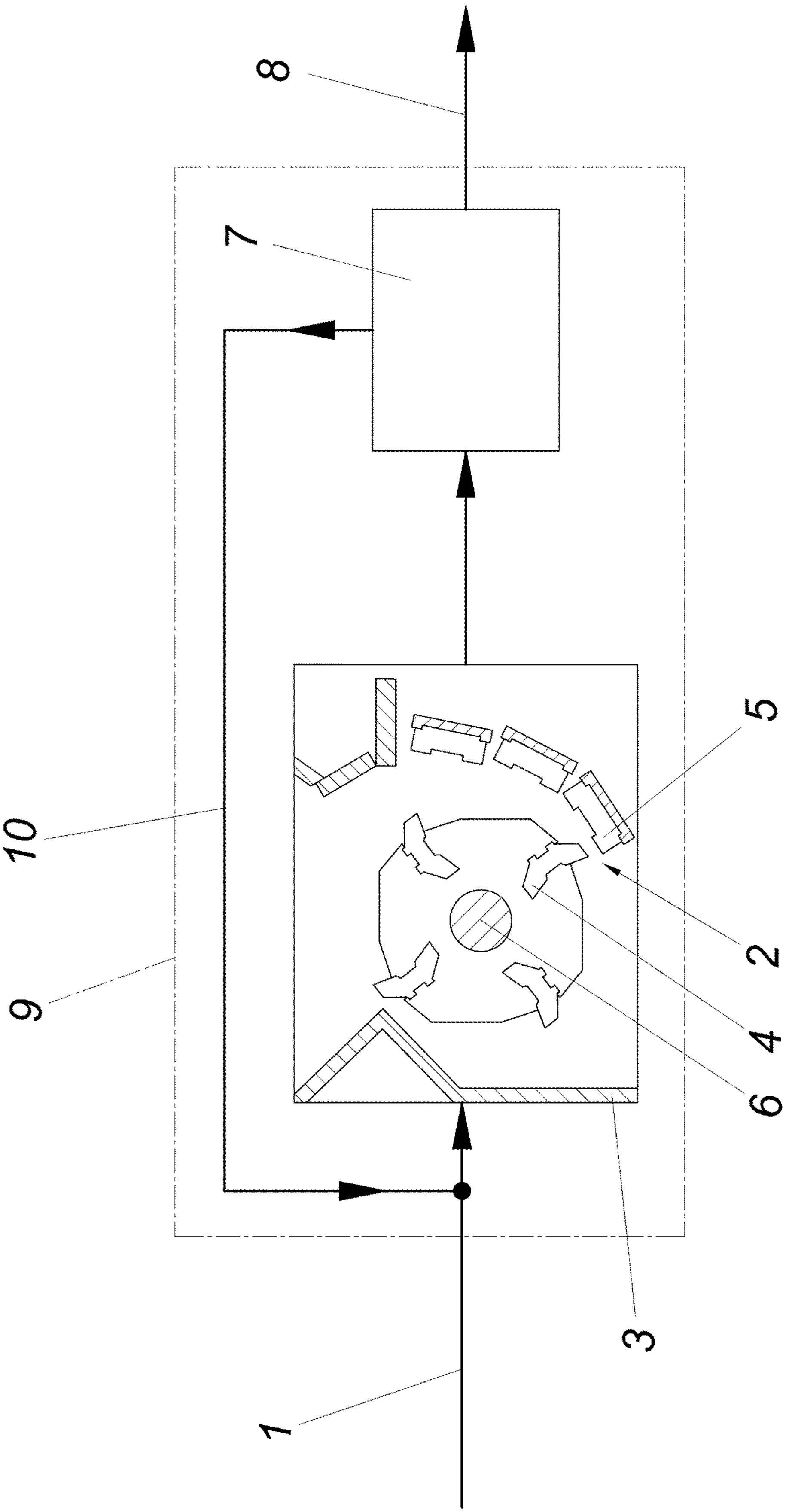
8
7
10
9
5
2
4
6
3
1

METHOD FOR CLEANING BLINDING PARTICLES IN CRUSHERS

FIELD OF THE INVENTION

The invention relates to a method for cleaning blocking-grains in crushers, wherein material to be crushed is fed to a crushing tool via a feed stream and is separated from there via a screen into a conveyor stream passing through the screen and a return stream retained by the screen and returned to the feed stream, thereby forming a conveying circuit.

DESCRIPTION OF THE PRIOR ART

Crushers, for example mobile impact crushers, are used in particular for the industrial processing of mineral material to be crushed into fine grain. In this context, the material to be crushed is fed via a feed stream to a crushing gap, usually formed between an impact plate and an impact bar, in an impact chamber and from there separated via a screen into a conveyor stream passing through the screen and a return stream retained by the screen and fed back into the feed stream. In particular, incompletely crushed material which cannot pass through the screen mesh due to its size and therefore has to be fed back into the crushing gap enters the return stream. In the course of such a processing process, however, screen mesh blockage can regularly occur due to any insufficiently crushed material, so that the effective screening area is reduced. As a result of the screen mesh blockage, the efficiency of the crusher is significantly reduced due to these so-called blocking-grains, which subsequently results in an economic disadvantage for the machine operator.

Methods have already been proposed (DE 102011001221 A1, DE 8106180 U1) for removing such blocking-grains from the screen meshes during crushing operation, wherein the screen meshes are knocked free with the aid of tapping bodies arranged on the screen surface. However, the provision of such tapping bodies reduces the available free screening area and thus ultimately the yield of fine grain produced. Moreover, additional energy input is required for the operation of the tapping bodies, so that the crusher operation proves to be less efficient overall despite the regularly tapped screen surface.

In addition, it is known in connection with screening machines (DE 20008762 U1) to increase the vibration amplitude of the screen for a short time during operation, so that the screen is subjected to vibrations of higher amplitude. However, the impulses transmitted to the blocking-grains by the vibrations of the screen are generally too low to allow reliable cleaning of the screen meshes. This means that, despite vibration amplitude modulation, the machine operator still has to temporarily stop the machine operation when there is a corresponding screen mesh blockage in order to manually remove blocking-grains from the screen meshes.

SUMMARY OF THE INVENTION

The invention is thus based on the object of designing a method of the type described at the beginning in such a way that an efficient, continuous crusher operation is made possible, wherein in particular standing times for the cleaning of the blocking-grains can be omitted.

The invention solves the object in that the material volume and/or the grain size distribution are measured at specified intervals in parts of the conveying circuit and/or in the conveyor stream and, in the event of deviation from the material volume and/or grain size distribution above a predetermined limit value, the grain size created by the crushing tool is increased for a predetermined period of time.

By increasing the grain size in the event of a deviation of material volume and/or grain size distribution above a predetermined limit value, coarse grain is specifically generated by the crushing tool within the predetermined time period, which is continuously fed to the impact chamber via the return stream and the feed stream in a conveying circuit in such a way that the screen meshes are knocked free by the impulse impact of the impinging coarse grain. The temporarily generated coarse grain thus essentially takes over the task of a freely movable tapping body, although the return of the coarse grain into the return stream prevents a reduction in the effective screening area during normal operation. It is particularly advantageous here that the coarse grain, which initially acts as a tapping body, is ultimately available again as material to be crushed after cleaning of the blocking-grains, and can be crushed into fine grain. Therefore, if the crushing gap is set back to the initial or a smaller value after the specified time period has elapsed, the previously produced coarse grain can also be crushed again and finally passes through the cleaned screen as fine grain into the conveyor stream. The fact that the method according to the invention enables effective cleaning of the blocking-grains while the crusher is in operation not only eliminates downtimes for manual cleaning of the screen meshes, but also the sometimes very energy-intensive shutdown and startup processes of the crusher that would otherwise be necessary for this purpose. Consequently, the method according to the invention creates the prerequisite for efficient crusher operation, especially from an economic point of view.

Preferably, the grain size distribution in the return stream is determined section by section in predetermined time steps. Since it has been shown that a shift in the grain size distribution towards smaller grain sizes in the return stream correlates directly with an increase in the screen mesh blockage, corresponding grain size distributions can be determined and from this a lower grain size limit can be defined as a limit value for initiating the temporary increase in grain size.

If the material volume and/or the grain size distribution is determined in sections of the conveyor stream in predetermined time steps, it is also possible to determine damage in the screen, for example due to torn-out screen meshes. This determination of screen damage is based on the knowledge that an increase in the material volume and/or a shift in the grain size distribution towards larger grain sizes in the conveyor stream is regularly due to damage in the screen, because the screen forms additional openings for larger grains, for example due to torn-out screen meshes, so that these can enter the conveyor stream more easily.

In practice, not only blocking-grains lead to unwanted screen mesh blockages, but also interfering materials such as plastic or wood waste, which can enter the crushing process in particular in the case of construction waste as fed crushing material, can clog the screen. In this context, the method according to the invention also enables the screen meshes to be effectively cleared of any impurities, which can then be removed from the material stream.

In order to enable an even more effective blocking-grains cleaning of the screen, it is recommended that in case of deviation of material volume and/or grain size distribution above a predefined limit value, the feed speed is reduced within the predefined period of time. Especially in case of an increase of the material volume in the conveying circuit, the reduced feed speed avoids an overload of the screen due to a material jam, so that the coarse grain can directly hit the screen for a good impulse transfer. In the case of a vibratory feeder as a feed unit to the crushing tool, the feed speed can be reduced, for example, by reducing the feeder frequency.

The cleaning of the blocking-grains can be further promoted by reducing the rotor speed of the crusher within the specified period of time if the material volume and/or grain size distribution deviates from a specified limit value. The lower rotational energy of the rotor arranged together with the impact plates in the impact chamber as a result of these measures means that the material to be crushed is also subjected to lower kinetic energy or lower impulses by the impact bars arranged on the periphery of the rotor and projecting radially from it. This, together with an increase in the crushing gap, i.e. the minimum distance between an impact bar and an impact plate, can promote the formation of larger coarse grain pieces within the specified time period. Due to its mass-related higher kinetic energy, the coarse grain facilitates the cleaning of the screen from blocking-grains.

Furthermore, the cleaning of the blocking-grains can also be improved by modulating the vibration amplitude of the screen or the frequency of the screen. In particular, the vibration amplitude and/or the frequency of the screen can be increased for this purpose.

In principle, known photogrammetric methods, such as those implemented with the aid of a stereo camera and laser triangulation, can be used for in-situ determination of the grain size distribution or the material volume. The disadvantage of these methods, however, is their limited recording and processing speed, so that the conveying speeds of the material streams or the belt speed of the conveyor unit must be reduced accordingly for reliable determination of the grain size distribution or the material volume. Even with complex systems that require a large amount of space, only belt speeds of less than 2 m/s can be achieved in this way. However, this also reduces the overall throughput and thus the efficiency of the crushing process. Furthermore, in such processes the grains must not overlap on the conveying unit, which is, however, unavoidable in realistic conveying operation.

In order to classify material to be crushed reliably at conveying speeds of more than 2 m/s, even in the case of overlaps, without having to take elaborate measures in terms of design, it is proposed that a depth image of the conveying circuit and/or of the conveyor stream is recorded in sections using a depth sensor, wherein the recorded two-dimensional depth image is fed to a previously trained convolutional neural network which has at least three convolution layers lying one behind the other, downstream of which a quantity classifier and/or a volume classifier is arranged for each class of a grain size distribution, wherein both quantity and volume classifiers can be designed, for example, as a so-called fully connected layer and wherein the output values of quantity classifier and/or volume classifier are output as the grain size distribution present in the detection area and/or as material volume. This is based on the consideration that when using two-dimensional depth images, the information necessary for grain size distribution and volume determination can be extracted from the depth information after a neural network used for this purpose has been trained with training depth images with known grain size distribution and known material volume. The convolution layers thereby reduce the input depth images to a set of individual features, which in turn are evaluated by the downstream volume classifier and/or volume classifier, so that as a result the grain size distribution and/or the total volume of the material mapped in the input depth image can be determined. The number of convolution layers provided, each of which may be followed by a pooling layer for information reduction, may be at least three, preferably five, depending on the available computing power. Between the convolution layers and the downstream volume classifier, a dimension reduction layer, a so-called flattening layer, can be provided in a known manner. The volume therefore no longer has to be calculated for each individual grain. Since in the depth image the distance of the imaged material to the depth sensor is mapped with only one value per pixel, the amount of data to be processed can be reduced in contrast to the processing of color images, the measuring procedure can be accelerated and the memory requirement necessary for the neural network can be reduced. As a result, the neural network can be implemented on inexpensive AI parallel computing units with GPU support and the method can be used regardless of the color of the bulk material. Also, the material volume can be determined by accelerating the measurement method even at conveyor belt speeds of 3 m/s, preferably 4 m/s. The aforementioned reduction in the amount of data in the depth image and thus in the neural network additionally lowers the susceptibility to errors for the correct determination of the grain size distribution and the material volume. In contrast to color or grayscale images, the use of depth images has the additional advantage that the measurement procedure is largely independent of changing exposure conditions. For example, a vgg16 network (Simonyan/Zisserman, Very Deep Convolutional Networks for Large-Scale Image Recognition, 2015), which is usually only used for color images, can be used as a neural network, which is reduced to only one channel, namely for the values of the depth image points. The depth image can be acquired, for example, with a 3D camera, since this can be arranged, for example, above conveyor belts of the conveying circuit and/or the conveyor stream, even if space is limited, due to its smaller footprint. In addition, in order to compensate for fluctuations in the detection of the grain size distribution and/or the volume and to compensate for erroneous output values of the neural network, several successive output values can be averaged and the average value can be output as the grain size distribution present in the detection area and/or as the material volume present in the detection area.

Training the neural network becomes more difficult and the measuring accuracy decreases during operation if elements foreign to the material to be crushed lie in the detection area of the depth sensor. These include, for example, vibrating components of a conveyor belt itself, or other machine elements. To avoid the resulting disturbances, it is suggested that the values of those pixels are removed from the depth image and/or the training depth image whose depth corresponds to a previously detected distance between depth sensor and a background for this pixel or exceeds this distance. In this way, disturbing image information, caused for example by vibrations of the conveyor belt, can be removed and both the depth images and the training depth images can be limited to the information relevant for the measurement.

Training the neural network requires large amounts of training depth images that represent the material to be acquired as accurately as possible. However, the amount of work required to measure the necessary amount of material is extremely high. In order to provide the neural network with sufficient training depth images to determine the material volume, it is proposed that sample depth images of a sample grain of known volume are acquired and stored together with the volume, whereupon several sample depth images are randomly combined to form a training depth image, to which as grain size distribution the class-wise distribution of the material volumes of the combined sample depth images and/or as material volume the sum of the volumes of the combined sample depth images is assigned, whereupon the training depth image is fed to the neural network on the input side and the assigned grain size distribution and/or the assigned material volume is fed to the neural network on the output side and the weights of the individual network nodes are adapted in a learning step. The training method is thus based on the consideration that by combining sample depth images of measured sample grains, manifold combinations of training depth images can be created. Thus, it is sufficient to acquire sample depth images of relatively few sample grains with their volume to generate a large number of training depth images with which the neural network can be trained. To train the neural network, the weights between the individual network nodes are adjusted in a known manner in the individual training steps so that the actual output value corresponds as closely as possible to the specified output value at the end of the neural network. Different activation functions can be specified at the network nodes, which are decisive for whether a sum value present at the network node is passed on to the next level of the neural network. Analogous to the volume, other parameters, such as the grain size distribution of the grains mapped in the sample depth image, can also be assigned to the sample depth images. For depth image processing, it is also proposed here that the values of those pixels whose depth corresponds to or exceeds a pre-detected distance between the depth sensor and the background for that pixel are removed from the depth image. As a result, the training depth images and the depth images of the measured material have only the information relevant for the measurement, thus achieving a more stable training behavior and increasing the recognition rate in the application. By selecting the sample depth images or the training depth images composed of them, the neural network can be trained on any type of bulk material.

To further improve the training behavior and recognition rate, it is proposed that the sample depth images with random alignment are combined to form a training depth image. Thus, for a given number of grains per sample depth image, the number of possible arrangements of the grains is significantly increased without the need to generate more sample depth images and overfitting of the neural network is avoided.

Separation of the grains of the material can be omitted and larger material volumes can be determined at a constant conveyor belt speed if the sample depth images with partial overlaps are combined to form a training depth image, wherein the depth value of the training depth image in the overlap area corresponds to the smallest depth of both sample depth images. In order to capture realistic material distributions, the cases where two grains come to lie on top of each other must be considered. The neural network can be trained to recognize such overlaps and still determine the volume of the sample grains.

BRIEF DESCRIPTION OF THE INVENTION

In the drawing, the subject matter of the invention is shown, for example, in a schematic flow diagram of a method according to the invention with a schematic sectional view of an impact chamber.

DETAILED DESCRIPTION OF THE PREFERRED EMBODIMENTS

A method according to the invention for cleaning blocking-grains in crushers is based, for example, on a preparation process of mineral material to be crushed to fine grain, wherein the material to be crushed, which is not shown in more detail, is fed via a feed stream 1 to a crushing gap 2 of a crushing tool. As this is schematically indicated in the drawing, the crushing gap 2 is formed in an impact chamber 3 between an impact bar 4 and an impact plate 5. The crushing gap is thus to be understood as the minimum distance between an impact bar 4 arranged on a rotor 6 and an impact plate 5. From the crushing gap 2, the feed stream 1 is separated via a screen 7 into a conveyor stream 8 passing through the screen 7 and a return stream 10 retained by the screen 7 and returned to the feed stream 1 to form a conveying circuit 9 indicated by a dashed frame.

In crusher operation, the material volume and/or the grain size distribution is determined in sections in the conveying circuit 9 and/or in the conveyor stream 8 in predetermined time steps. For example, it has been shown that in the return stream 10 located in the conveying circuit 9, a shift in the grain size distribution towards smaller grain sizes correlates directly with an increase in the screen mesh blockage. As a result, corresponding screen characteristics can be determined and from this a lower grain size limit can be set as a limit value for initiating the cleaning of the blocking-grains.

For example, when the grain size distribution in the return stream 10 deviates above the predetermined limit value, the crushing gap 2 is enlarged for a predetermined period of time. As a result of the larger crushing gap 2, coarse grain can be produced in a targeted manner within the predetermined period of time, which is continuously fed via the return stream 10 and the feed stream 1 to the impact chamber 3 in the feed circuit 9 in such a way that the screen meshes of the screen 7 are knocked free by the impulse impact of the impinging coarse grain. After the specified time period has elapsed, the crushing gap 2 is set again to the initial or a smaller value so that the previously produced coarse grain can also be crushed again and finally passes through the cleaned screen 7 as fine grain into the conveyor stream 8.

In order to enable an even more effective cleaning of blocking-grains of the screen 7, the feed speed can be reduced within the specified period of time if the material volume and/or grain size distribution deviates above a specified limit value. Analogously, the speed of the rotor 6 can also be reduced. The lower occurring rotational energy of the rotor 6 arranged together with the impact plates 5 in the impact chamber 3 as a result of this measure leads to the material to be crushed also being acted upon with a lower kinetic energy or lower impulses by the impact bars 4 arranged on the periphery of the rotor 6 and projecting radially from it. This further favors the generation of coarse grain within the specified time period.

The invention claimed is:

1. A method for cleaning blocking-grains in crushers, said method comprising:

feeding material to be crushed to a crushing tool via a feed stream; and separating the material from the feed stream via a screen into a conveyor stream passing through the screen and into a return stream retained by the screen and returned to the feed stream so as to form a conveying circuit;

determining a grain size distribution and/or a material volume in predetermined time steps in parts of the conveying circuit and/or in the conveyor stream; and responsive to a determination that the grain size distribution and/or material volume is above a predetermined limit value, increasing a grain size produced by the crushing tool for a predetermined period of time.

2. The method according to claim 1, wherein when the grain size distribution and/or material volume is above the predetermined limit value, a feed speed of the feeding of the material is reduced within the predetermined period of time.

3. The method according to claim 1, wherein when the grain size distribution and/or material volume above the predetermined limit value, a rotor speed of the crusher is reduced within the predetermined period of time.

4. The method according to claim 1, wherein the method further comprises acquiring a two-dimensional depth image of the conveying circuit and/or of the conveyor stream in sections with a depth sensor, transmitting the acquired two-dimensional depth image to a previously trained convolutional neural network that has at least three convolution layers lying one behind the other and, for each class of a grain size distribution, a quantity classifier and/or a volume classifier downstream of the convolutional layers, and transmitting output values of the quantity classifier and/or volume classifier as the grain size distribution and/or as material volume present in a detection area.

5. The method according to claim 4, wherein the method further comprises removing values of pixels from the depth image where said pixels each have a respective depth that corresponds to or exceeds a previously detected distance between the depth sensor and a background for this pixel.

6. A training method for training a neural network for a method according to claim 4, said training method comprising:

acquiring sample depth images of a respective sample grain with a known volume and storing said sample depth images together with the known volume;

combining a plurality of sample depth images randomly so as to form a training depth image, said training depth image having assigned thereto a class-wise distribution of material volumes of the combined sample depth images as grain size distribution and/or a sum of the volumes of the combined sample depth images as material volume;

transmitting the training depth image to the neural network on the input side thereof and the assigned grain size distribution and/or the assigned material volume to the neural network on the output side thereof; and a learning step wherein weights of individual network nodes are adapted.

7. The training method according to claim 6, wherein the sample depth images combined so as to form a training depth image have random alignment.

8. The training method according to claim 6, wherein the sample depth images with partial overlaps are combined to form a training depth image, wherein the depth value of the training depth image in a region of one or more of the overlaps corresponds to the smallest depth of both sample depth images.

9. The training method according to claim 7, wherein the sample depth images with partial overlaps are combined to form a training depth image, wherein the depth value of the training depth image in a region of one or more of the overlaps corresponds to the smallest depth of both sample depth images.

10. The method according to claim 2, wherein when the grain size distribution and/or material volume above the predetermined limit value, a rotor speed of the crusher is reduced within the predetermined period of time.

11. The method according to claim 10, wherein the method further comprises acquiring a two-dimensional depth image of the conveying circuit and/or of the conveyor stream in sections with a depth sensor, transmitting the acquired two-dimensional depth image to a previously trained convolutional neural network that has at least three convolution layers lying one behind the other and, for each class of a grain size distribution, a quantity classifier and/or a volume classifier downstream of the convolutional layers, and transmitting output values of the quantity classifier and/or volume classifier as the grain size distribution and/or as material volume present in a detection area.

12. The method according to claim 2, wherein the method further comprises acquiring a two-dimensional depth image of the conveying circuit and/or of the conveyor stream in sections with a depth sensor, transmitting the acquired two-dimensional depth image to a previously trained convolutional neural network that has at least three convolution layers lying one behind the other and, for each class of a grain size distribution, a quantity classifier and/or a volume classifier downstream of the convolutional layers, and transmitting output values of the quantity classifier and/or volume classifier as the grain size distribution and/or as material volume present in a detection area.

13. The method according to claim 3, wherein the method further comprises acquiring a two-dimensional depth image of the conveying circuit and/or of the conveyor stream in sections with a depth sensor, transmitting the acquired two-dimensional depth image to a previously trained convolutional neural network that has at least three convolution layers lying one behind the other and, for each class of a grain size distribution, a quantity classifier and/or a volume classifier downstream of the convolutional layers, and transmitting output values of the quantity classifier and/or volume classifier as the grain size distribution and/or as material volume present in a detection area.

* * * * *